(12) United States Patent
Salour et al.

(10) Patent No.: US 9,384,461 B2
(45) Date of Patent: Jul. 5, 2016

(54) SYSTEMS AND METHODS FOR TRACKING AND ANALYZING INFORMATION ASSOCIATED WITH A LIFE CYCLE OF A COMPOSITE PART

(71) Applicant: THE BOEING COMPANY, Huntington Beach, CA (US)

(72) Inventors: Ali Salour, Fenton, MO (US); Jolynnetta Aisha Neal, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/516,645

(22) Filed: Oct. 17, 2014

(65) Prior Publication Data

US 2016/0110680 A1   Apr. 21, 2016

(51) Int. Cl.
*G06F 17/00* (2006.01)
*G06Q 10/08* (2012.01)

(52) U.S. Cl.
CPC .................................. *G06Q 10/087* (2013.01)

(58) Field of Classification Search
USPC ............... 235/375, 376, 385; 340/572.1, 5.92
See application file for complete search history.

(56) References Cited

U.S. PATENT DOCUMENTS

| | | |
|---|---|---|
| 5,768,384 A | 6/1998 | Berson |
| 6,446,017 B1 | 9/2002 | Skidmore |
| 6,622,102 B2 | 9/2003 | Skidmore |
| 7,158,034 B2 | 1/2007 | Corbett, Jr. |
| 7,302,307 B1 | 11/2007 | Anderson et al. |
| 7,433,750 B2 | 10/2008 | Ho et al. |
| 7,815,036 B2 | 10/2010 | Spangler et al. |
| 7,918,389 B2 | 4/2011 | Dwyer et al. |
| 2013/0096710 A1 | 4/2013 | Pinarbasi et al. |

*Primary Examiner* — Ahshik Kim
(74) *Attorney, Agent, or Firm* — Armstrong Teasdale LLP (57) ABSTRACT

A method for tracking information associated with a manufactured part is provided. The method is implemented by at least one computing device including at least one processor in communication with a memory. The method includes generating, by the at least one computing device, a panel identifier to be applied to a composite material panel. The method additionally includes storing, in the memory, at least one curing parameter associated with a curing process performed on the composite material panel in association with the panel identifier, generating, by the at least one computing device, at least one part identifier to be applied to at least one part machined from the composite material panel, and storing, in the memory, at least one part processing parameter in association with at least one process performed on the at least one part.

19 Claims, 5 Drawing Sheets

SYSTEMS AND METHODS FOR TRACKING AND ANALYZING INFORMATION ASSOCIATED WITH A LIFE CYCLE OF A COMPOSITE PART

BACKGROUND

The present disclosure relates generally to tracking information associated with manufactured parts, and more specifically to tracking information pertaining to parts made from composite materials.

In at least some known systems, information relating to the manufacture of parts from composite materials is collected for less than all of the stages of the manufacturing process. Further, in some systems, the collected data is stored in a different format or in a different location for each stage of the manufacturing process, making it difficult to obtain the manufacturing information for a particular part at a central location. Accordingly, if a part deviates from predefined specifications, it may be difficult to identify the stage of the manufacturing process that caused the deviation. It would be beneficial to store information pertaining to each of the stages of the manufacture of a composite material part in a central repository together with embedded data analytics for implementing improvements in efficiency and quality control that is accessible to managers and engineers.

BRIEF DESCRIPTION

In one aspect, a method for tracking information associated with a manufactured part is provided. The method is implemented by at least one computing device including at least one processor in communication with a memory. The method includes generating, by the at least one computing device, a panel identifier to be applied to a composite material panel. The method additionally includes storing, in the memory, at least one curing parameter associated with a curing process performed on the composite material panel in association with the panel identifier. Additionally, the method includes generating, by the at least one computing device, at least one part identifier to be applied to at least one part machined from the composite material panel, and storing, in the memory, at least one part processing parameter in association with at least one process performed on the at least one part.

In another aspect, a system for use in tracking information associated with a manufactured part is provided. The system includes at least one computing device in communication with a memory. The at least one computing device is configured to generate a panel identifier to be applied to a composite material panel. Additionally, the at least one computing device is configured to store, in the memory, at least one curing parameter associated with a curing process performed on the composite material panel in association with the panel identifier, generate at least one part identifier to be applied to at least one part machined from the composite material panel, and store, in the memory, at least one part processing parameter in association with at least one process performed on the at least one part.

In another aspect, an aircraft part formed from a panel of composite material is provided. The aircraft part has at least one tag applied thereto. The at least one tag includes a panel identifier and a part identifier. The panel identifier and the part identifier are stored in a repository in association with information pertaining to an origin of the composite material and manufacturing processes performed to generate the aircraft part.

DETAILED DESCRIPTION

Implementations of the systems and methods described herein generate rich information about the manufacturing process for a composite part from capital equipment and production systems. Further, the implementations of the systems and methods enable the use of data analytics for process and quality management for such composite parts. In particular, implementations of the systems and methods described herein enable material and part traceability, enabling a user to track finished parts to their pedigree source. More specifically, implementations of the systems and methods described herein enable tracking the manufacturing stages from raw material to ply sets, to stock panel, to trimming of the components that make a part, to assembly of the part, and to installation of the part. Using implementations of the system described herein, a person (e.g., a manager or engineer) may retrieve information pertaining to a part location and/or part cost in terms of process, energy, materials, and manpower allocation, in real time. At any given point in time, manufacturing data can be assembled and reported for audits, scrap usage, throughput, and utilization. At any given point in time, manufacturing data can be assembled and reported for quality audits, traceability of anomalies, scrap usage, throughput, and utilization.

Implementations of the system also solve the problem of having to combine data from independent data sources by providing a common digital thread between multiple equipment and assembly stages to draw out critical manufacturing as-built data and compare that to as-designed or specified process data for inspection and quality measurement. Furthermore, at each production process point the preceding data can be traced in real time for auditing and certification of acceptable engineering/manufacturing requirements while additional data is incrementally added at that point. In at least some implementations, the unique part identification is physically traced by electronic chips that can be automatically scanned to create the system interface to the part identification number. Implementations of the system create a seamless association to the capital equipment and sub-assembly operations to match the process and dimensional data to the specified quality and process standards, which can trigger alerts pertaining to deviations from predefined parameters (this includes potential slip in schedule or potential delays). Life-cycle data is made of historical records from raw materials to finished assemblies in a concise traceable chain that can be reviewed for validation anywhere within the build process. Implementations of the system provide robust documentation of traceable manufacturing and engineering attributes to validate aircraft parts and materials origin.

Implementations of the disclosure create a quick and easy tool to track material and process during the manufacturing steps from raw material to finished parts. The following benefits can be derived during the manufacturing and delivery steps: (i) status of in-process material and parts for quality assurance; (ii) product quality certification; (iii) traceability and root cause analysis when product specifications differ from predefined engineering specifications; and (iv) determination of exact detailed parts and materials used in every assembly, thereby, facilitating quality audits.

Having historical data is another major benefit that can be used for trend analysis and manufacturing quality verification. This type of data can be applied for life-cycle and performance analysis in collaboration with the airline customer. The concept can be transitioned to a variety of structural components.

Figure 1:
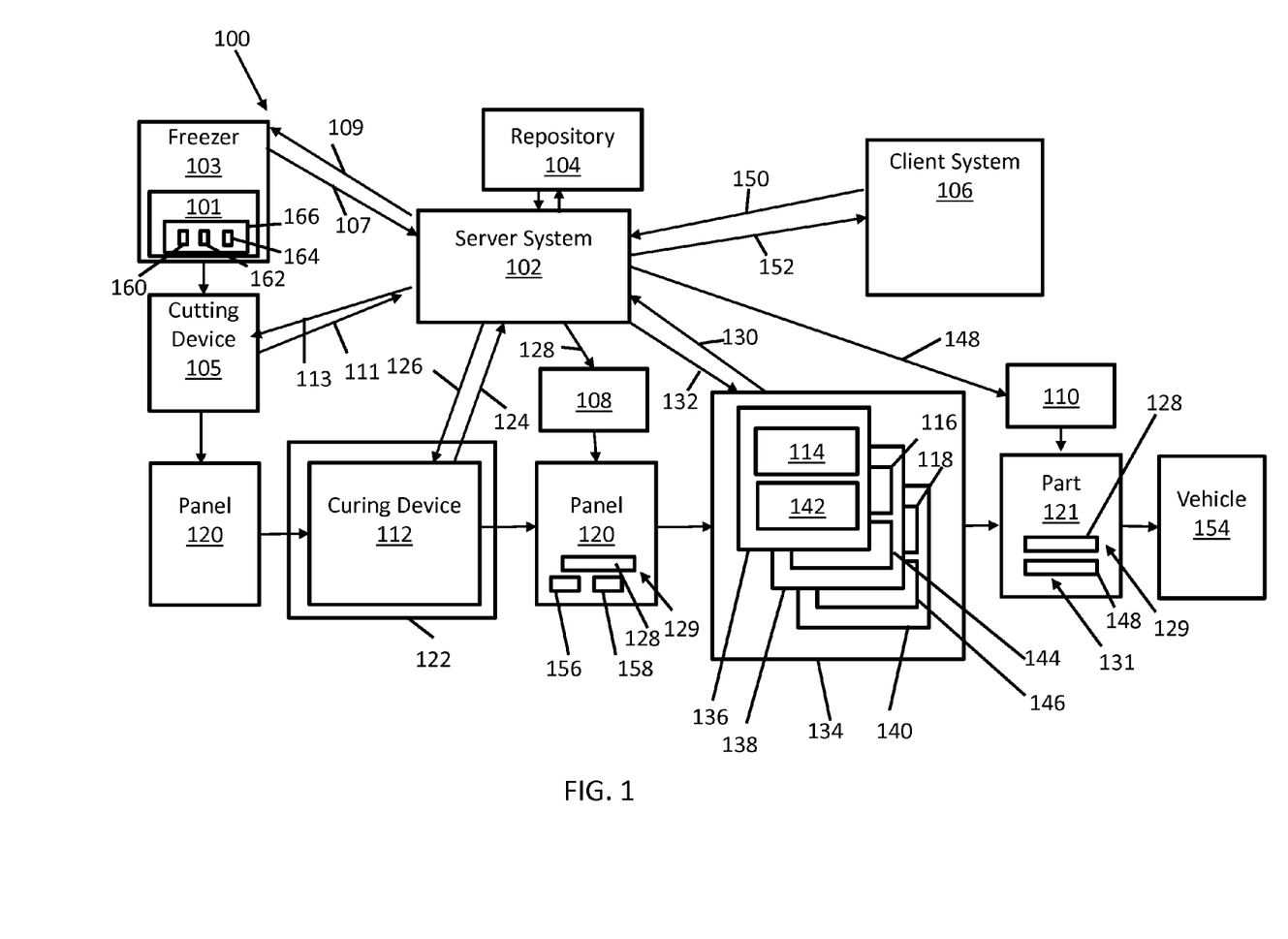
FIG. 1 is a diagram of an example environment in which a server system tracks information associated with a manufactured part.

FIG. 1 is a diagram of an example environment 100 in which a server system 102 tracks information associated with a manufactured part 121. Server system 102 is communicatively coupled to a repository 104 to store and retrieve information therefrom. Additionally, server system 102 is communicatively coupled to at least one client system 106. Client system 106 transmits queries to server system 102 and receives data from server system 102 in response to the queries, as described herein. Additionally, server system 102 is coupled to a first identification device 108 and to a second identification device 110. First identification device 108 includes, for example, a printer. In some implementations, first identification device 108 additionally includes a scanner for reading a label, a barcode, and/or a radio frequency identification (RFID) tag. Second identification device 110 is similarly configured. In some implementations, first identification device 108 and second identification device 110 are integrated into a single device. In some implementations, at least one of first identification device 108 and second identification device 110 are included in server system 102. Additionally, server system 102 is coupled to a freezer 103, a ply cutting device 105, a curing device 112, a first part processing device 114, a second part processing device 116, and a third part processing device 118, as described in more detail herein.

Initially, raw material 101 is stored in freezer 103 for a predetermined time period. In some implementations, freezer 103 transmits freezer parameters 107 to server system 102. In some implementations, server system 102 transmits freezer instructions 109 to freezer 103. In some implementations, freezer parameters 107 and/or freezer instructions 109 include at least one of a temperature and a length of time (e.g., a length of time raw material 101 is stored in freezer 103 at the temperature). In some implementations, freezer parameters 107 include a shelf life and in/out time stamps associated with raw material 101. In at least some implementations, freezer parameters 107 additionally specify a material lot number 162 and a material part number 164 associated with raw material 101. For example, freezer 105 is associated with or includes an identification device (not shown), similar to identification devices 108 and 110, described in more detail below, that identifies the material lot number 162 and the material part number 164 of the raw composite material 101. For example, the material lot number 162 and material part number 164, in at least some implementations, are included on a tag 166, for example a label, barcode, or radio frequency identification (RFID) tag, applied to raw material 101 or a box in which raw material 101 is stored. In at least some implementations, server system 102 stores freezer parameters 107 in association with the material lot number 162 and material part number 164 associated with the raw material 101.

Next, raw material 101 is transported to a ply cutting device 105, which cuts raw material 101 into at least one panel 120, for example a panel of composite material. In some implementations, ply cutting device 105 transmits cutting parameters 111 to server system 102. In some implementations, server system 102 transmits cutting instructions 113 to ply cutting device 105. Cutting parameters include dimensions for example dimensions of raw material 101 entering into ply cutting device 105 and/or dimensions of panel 120 to be cut from raw material 101, a time that raw material 101 entered into ply cutting device 105 and a time that raw material 101 exited ply cutting device 105. In at least some implementations, cutting parameters 111 additionally include a raw material identifier 160 associated with raw material 101. For example, ply cutting device 105 is associated with or includes an identification device (not shown), similar to identification devices 108 and 110, described in more detail below, that identifies the raw material identifier 160. For example, the raw material identifier 160, in at least some implementations, is included on tag 166, for example a label, a barcode, or a radio frequency identification (RFID) tag, in or on raw material 101. In at least some implementations, server system 102 stores cutting parameters 111 in association with the raw material identifier.

Subsequently, after being cut to the appropriate dimensions by cutting device 105, the panel 120 is subsequently transported to and is placed in the curing device 112. Curing device 112 performs a curing process 122 on panel 120. Curing device 112 transmits curing parameters 124 to server system 102, including measured temperatures within curing device 112 and measured pressures within curing device 112 during curing process 122. In some implementations, server system 102 transmits one or more instructions to curing device 112, for example to control one or more aspects of curing process 122. Server system 102 stores curing parameters 124 in repository system 104 in association with panel 120. More specifically, server system 102 generates a panel identifier 128 associated with panel 120 and stores curing parameters 124 in association with panel identifier 128. In some implementations, server system 102 associates the panel identifier 128 with an age 156 (e.g., an age of the composite material in panel 120) and a panel lot number 158 before cure process in the central repository 104. In some implementations, curing parameters 124 are a stream of real-time parameters. In at least some implementations, server system 102 filters curing parameters 124 and stores only a subset of curing parameters 124 in repository system 104. More specifically, in some implementations, server system detects peak values such as a peak temperature and a peak pressure measured by curing device 112 during curing process 122, and stores the peak values in repository 104 in association with panel identifier 128.

Server system 102 transmits panel identifier 128 to first identification device 108. First identification device 108 includes, for example, a printer. First identification device 108 applies panel identifier 128 to panel 120 after curing process 122 has finished. For example, in some implementations, first identification device 108 applies tag 129, for example a label, a barcode, and/or a radio frequency identification (RFID) tag including panel identifier 128 to panel 120. In some implementations, first identification device 108 additionally includes a scanner that scans or reads panel identifier 128 from panel 120.

Additionally, panel 120 enters one or more part processing stages 134. Part processing stages 134 include a first part processing stage 136 performed by first part processing device 114, a second part processing stage 138 performed by second part processing device 116, and a third part processing stage 140 performed by third part processing device 118. Server system 102 receives part processing parameters 130 from one or more of first part processing device 114, second part processing device 116, and third part processing device 118 pertaining to part processing stages 134. More specifically, part processing parameters 130 include first stage parameters 142, second stage parameters 144, and third stage parameters 146. In some implementations, server system 102 transmits part processing instructions 132 to one or more of first part processing device 114, second part processing device 116, and third part processing device 118 (to the user) for performing part processing stages 134. In some implementations, processing stages 134 includes a different number of stages than three. In some implementations, processing stages 134 include one or more of cutting operations to create multiple parts (e.g., part 121) from a panel (e.g., panel 120), integration and structure assembly and/or fastening, multiple oven cycles for sealing, silk screening, and/or painting, structure joining, system integration, staging, and shipping. Accordingly, first stage 136 in at least some implementations is partitioning panel 120 into a plurality of parts, including part 121. Accordingly, first part processing device 114 includes, for example, one or more routers that cut part 121 from panel 120. In some implementations, part processing parameters 130 include one or more of measured dimensions of panel 120, measured dimensions of part 121, measured temperatures, for example oven temperatures, freezer temperatures, and/or water temperatures (e.g., for crush core dyes), measured pressures, and time periods associated with each of part processing stages 134 (e.g., starting dates and times and ending dates and times).

Second identification device 110 applies a part identifier 148 to part 121. In some implementations, server system 102 generates part identifier 148 and transmits part identifier 148 to second identification device 110 to be applied to part 121. Second identification device 110 includes, for example, a printer. Second identification device 110 applies part identifier 148 to part 121, for example, after part 121 has been cut from panel 120 (e.g., first stage 136). For example, in some implementations, second identification device 110 applies a tag 131, for example a label, a barcode, and/or a radio frequency identification (RFID) tag including part identifier 148 to part 121. In some implementations, second identification device 110 additionally includes a scanner that automatically scans or reads part identifier 148 from panel 120. For example, in some implementations, second identification device 110 transmits part identifier 148 to one or more of first part processing device 114, second part processing device 116, and third part processing device 118. Accordingly, in transmitting part processing parameters 130 to server system 102, one or more of first part processing device 114, second part processing device 116, and third part processing device 118 include part identifier 148 in part processing parameters 130. As described above, server system 102 stores part processing parameters 130 in repository system 104 in association with part identifier 148. In some implementations, server system 102 filters part processing parameters 130 and stores only a subset of part processing parameters 130 in repository 104. More specifically, in some implementations, server system 102 detects peak values in part processing parameters 130 and stores the peak values in repository 104 in association with part identifier 148.

Client system 106 transmits a query signal 150 to server system 102 and server system 102 transmits a data signal 152 to client system 106, for example in response to query signal 150. For example, in some implementations, server system 102 receives query signal 150 including one or more of panel identifier 128 and part identifier 148. In response, server system 102 retrieves information from repository 104 relating to panel identifier 128 and/or part identifier 148. For example, in some implementations, server system 102 transmits a progress (e.g., percentage completion) of part 121, one or more curing parameters 124 and/or part processing parameters 130, a schedule associated with panel 120 and/or part 121, and/or a change to the schedule (e.g., slippage) based, for example, on timing information in curing parameters 124 and/or part processing parameters 130 stored in repository 104. In some implementations, server system 102 detects that one or more of curing parameters 124 and part processing parameters 130 exceeds a predefined threshold (e.g., a predefined temperature or pressure) and transmits an alert or other notification, for example in data signal 152, to client system 106. In response, in at least some implementations, client system 106 transmits instructions for corrective action to server system 102. Accordingly, server system 102 includes the instructions for corrective action in one or more of curing instructions 126 and part processing instructions 132. In some implementations, part 121 is installed into a product, such as a vehicle 154 (e.g., an aircraft). Examples of parts 121 include stow bins, side walls, partitions, and crew stations.

Figure 2:
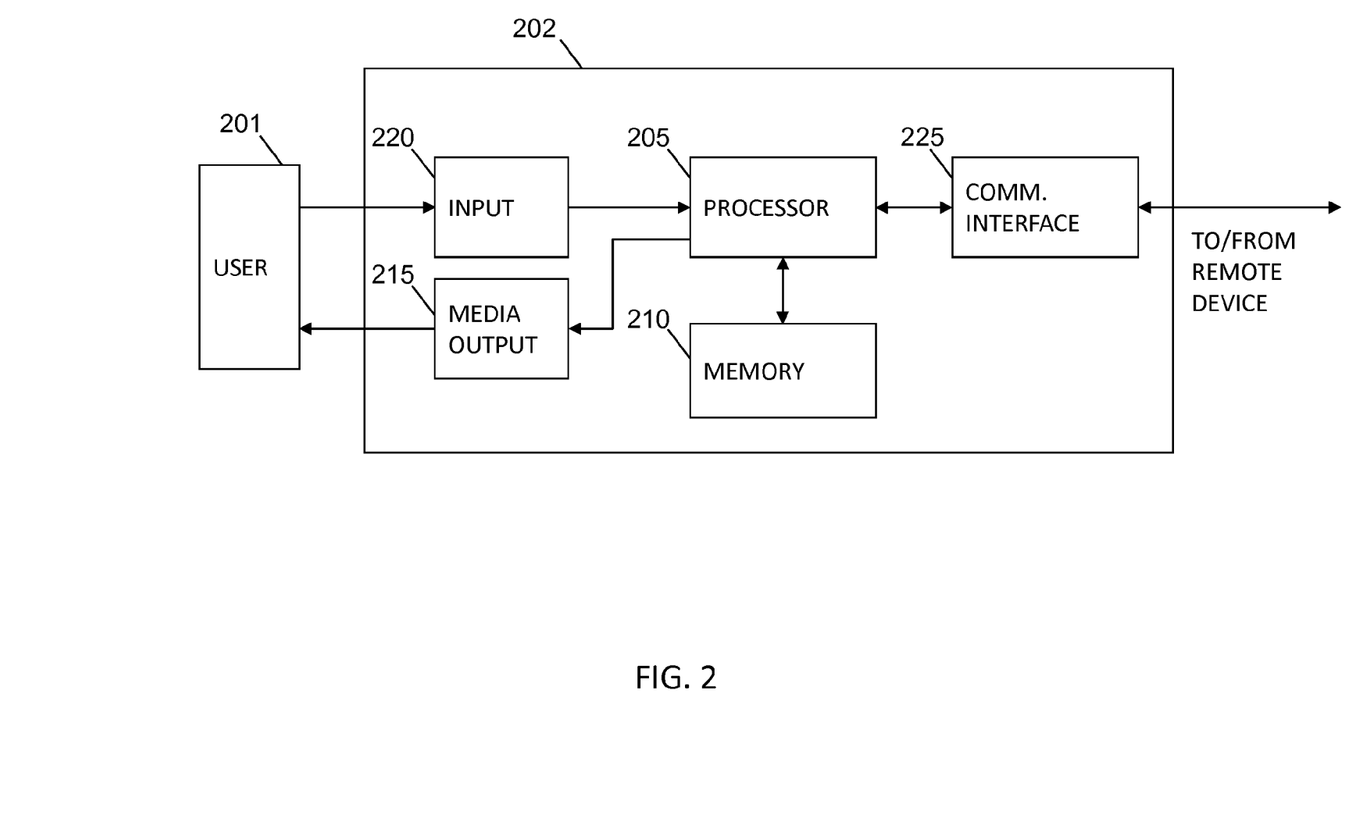
FIG. 2 is a diagram of an example client computing device used in the environment shown in FIG. 1.

FIG. 2 is a diagram of an example client computing device 202 used in environment 100. Client computing device 202 is representative of client system 106, first identification device 108, second identification device 110, curing device 112, first part processing device 114, second part processing device 116, and third part processing device 118. More specifically, client system 106, first identification device 108, second identification device 110, curing device 112, first part processing device 114, second part processing device 116, and third part processing device 118 each include one or more components of client computing device 202.

Client computing device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer-readable media.

Client computing device 202 also includes at least one media output component 215 for presenting information to a user 201. Media output component 215 is any component capable of conveying information to user 201. In some embodiments, media output component 215 includes an output adapter such as a video adapter and/or an audio adapter. An output adapter is operatively coupled to processor 205 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

Client computing device 202 may also include a communication interface 225, which is communicatively coupleable to a remote device such as server system 102. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer-readable instructions for providing a user interface to user 201 via media output component 215 and, optionally, receiving and processing input from input device 220. A user interface may include, among other possibilities, a web browser and/or client application that provides and/or receives information from user 201.

Figure 3:
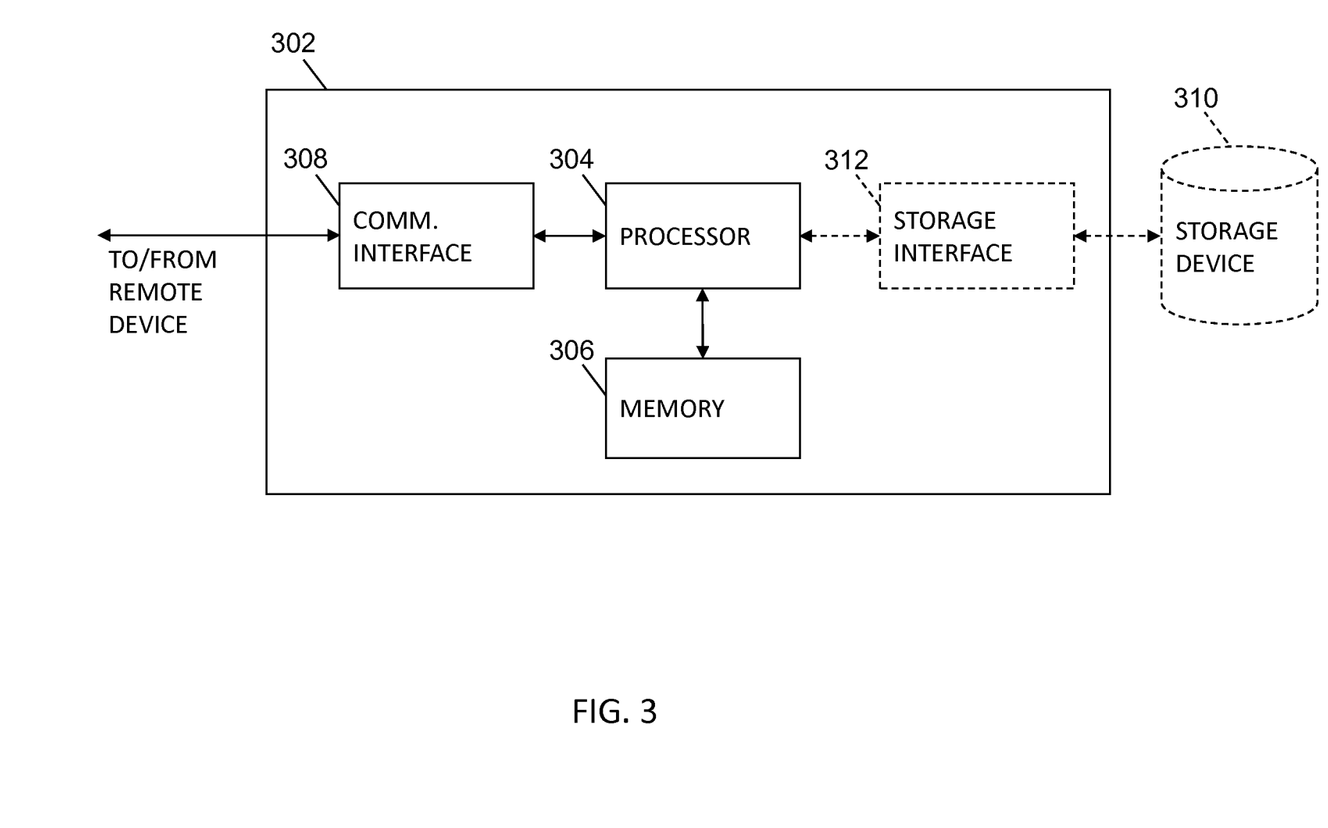
FIG. 3 is a diagram of an example server computing device used in the environment shown in FIG. 1.

FIG. 3 illustrates an example configuration of a server computing device 302 used in environment 100. Server computing device 302 is representative of server system 102. Server computing device 302 includes a processor 304 for executing instructions. Instructions may be stored in a memory area 306, for example. Processor 304 may include one or more processing units (e.g., in a multi-core configuration).

Processor 304 is operatively coupled to a communication interface 308 such that server computing device 302 is capable of communicating with a remote device such as client computing device 202 or another server computing device 302. For example, communication interface 308 may receive requests from client system 106 via a network, such as the Internet or a local area network (LAN).

Processor 304 may also be operatively coupled to a storage device 310. Storage device 310 is representative of repository 104 (FIG. 1). Storage device 310 is any computer-operated hardware suitable for storing and/or retrieving data. In some embodiments, storage device 310 is integrated in server computing device 302. For example, server computing device 302 may include one or more hard disk drives as storage device 310. In other embodiments, storage device 310 is external to server computing device 302 and may be accessed by a plurality of server computing devices 302. For example, storage device 310 may include multiple storage units such as hard disks or solid state disks in a redundant array of inexpensive disks (RAID) configuration. Storage device 310 may include a storage area network (SAN) and/or a network attached storage (NAS) system. In some implementations, storage device 310 stores real time information (e.g., parameters) pertaining to the manufacture of a part.

In some embodiments, processor 304 is operatively coupled to storage device 310 via a storage interface 312. Storage interface 312 is any component capable of providing processor 304 with access to storage device 310. Storage interface 312 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 304 with access to storage device 310.

Memory areas 210 and 306 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 4:
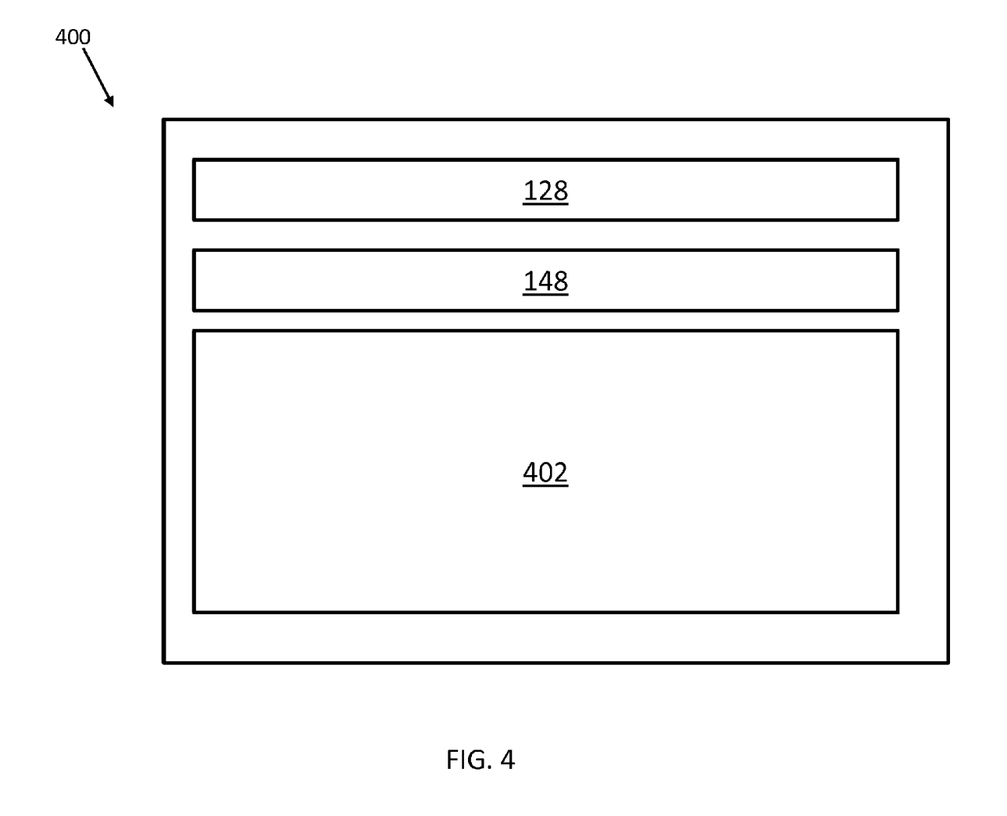
FIG. 4 is a diagram of an example user interface that displays information associated with a manufactured part.

FIG. 4 is a diagram of an example user interface 400 that displays information associated with a manufactured part, such as part 121 (FIG. 1). For example, client system 106 displays user interface 400 to a user (e.g., user 201). User 201 enters panel identifier 128 and part identifier 148 into user interface 400, for example using input device 220 (FIG. 2).

Client system 106 then transmits query signal 150 to server system 102 including panel identifier 128 and part identifier 148. Server system 102 retrieves part information 402 from repository 104 and transmits part information 402 to client system 106 in data signal 152. Client system 106 then displays part information 402 on user interface 400. Part information 402 includes, in at least some implementations, one or more of curing parameters 124, part processing parameters 130, progress information for the manufacture of part 121, scheduling information, origin information such as where raw material 101 of panel 120 came from, when and where curing process 122 occurred, when and where each of processing stages 134 occurred, and other information pertaining to panel 120 and part 121.

Figure 5:
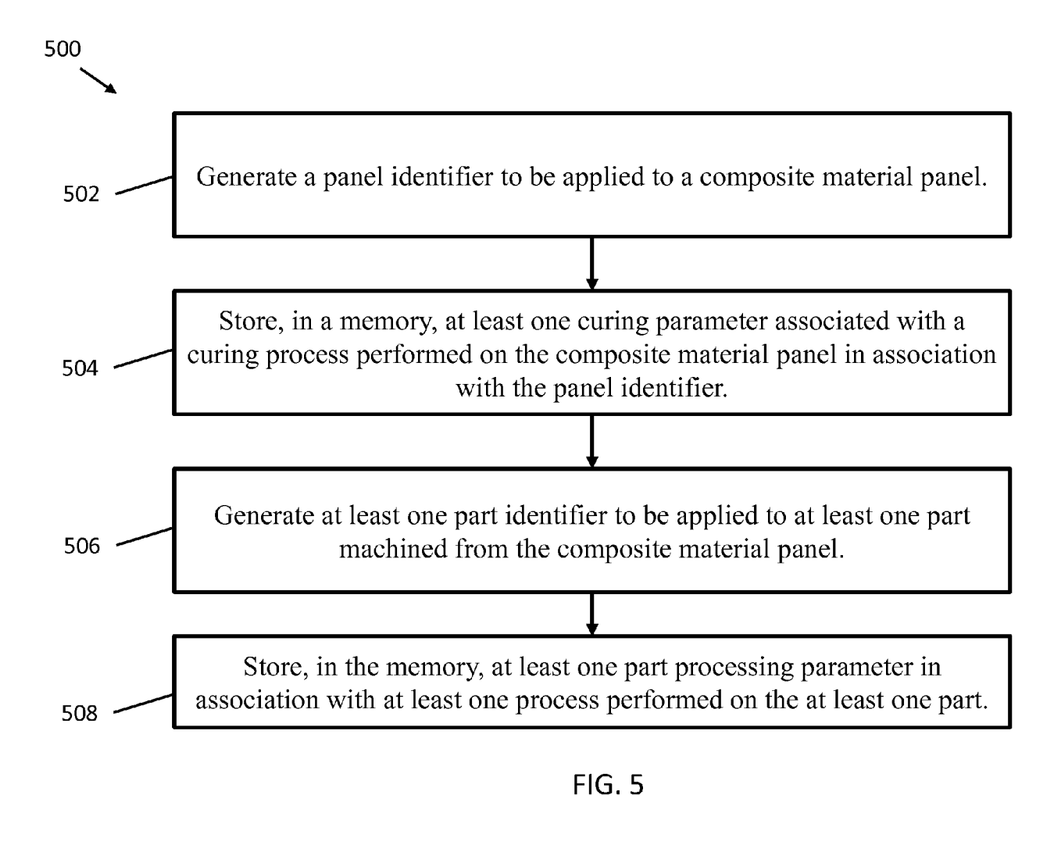
FIG. 5 is a flowchart of an example process for tracking information associated with a manufactured part.

FIG. 5 is a flowchart of an example process 500 for tracking information associated with a manufactured part (e.g., part 121). Process 500 is implemented by at least one computing device, for example server system 102. Initially, the at least one computing device (e.g., server system 102) generates 502 a panel identifier (e.g., panel identifier 128) to be applied to a composite material panel (e.g., panel 120). Additionally, the at least one computing device (e.g., server system 102) stores 504, in a memory (e.g., repository 104), at least one curing parameter (e.g., curing parameters 124) associated with a curing process (e.g., curing process 122) performed on the composite material panel (e.g., panel 120) in association with the panel identifier (e.g., panel identifier 128). Additionally, at least one computing device (e.g., server system 102) generates 506 at least one part identifier (e.g., part identifier 148) to be applied to at least one part (e.g., part 121) machined from the composite material panel (e.g., panel 120). Additionally, at least one computing device (e.g., server system 102) stores 508, in the memory (e.g., repository 104), at least one part processing parameter (e.g., part processing parameters 130) in association with at least one process (e.g., part processing stages 134) performed on the at least one part (e.g., part 121).

In some implementations, process 500 additionally includes associating an age (e.g., age 156) and a panel lot number (e.g., panel lot number 158) with the panel identifier (e.g., panel identifier 128). In some implementations, process 500 additionally includes applying the panel identifier (e.g., panel identifier 128) to the composite material panel (e.g., panel 120) in at least one of a label, a barcode, and a radio frequency identification (RFID) tag. In some implementations, process 500 additionally includes applying the at least one part identifier (e.g., part identifier 148) to the at least one part (e.g., part 121) in at least one of a label, a barcode, and a radio frequency identification (RFID) tag. In some implementations, process 500 additionally includes receiving a stream of data including a plurality of part processing parameters (e.g., part processing parameters 130), filtering the stream of data to obtain peak values of the part processing parameters (e.g., part processing parameters 130), and storing the peak values of the part processing parameters in the memory (e.g., repository 104) in association with the at least one part identifier (e.g., part identifier 148).

As described above, in some implementations, storing at least one curing parameter (e.g., curing parameters 124) further includes storing at least one of a peak temperature and a peak pressure applied to the composite material panel (e.g., panel 120) during the curing process (e.g., curing process 122). In some implementations, process 500 additionally includes detecting that one or more of the at least one curing parameter (e.g., curing parameters 124) and the at least one part processing parameter (e.g., part processing parameters 130) has exceeded a predefined threshold value, and generating an alarm (alert) based on the detection. In some implementations, process 500 additionally includes receiving, from a client computing device (e.g., client system 106), a query signal (e.g., query signal 150) that includes the panel identifier (e.g., panel identifier 128) and the part identifier (e.g., part identifier 148), retrieving at least one of the curing parameters (e.g., curing parameters 124) and the part processing parameters (e.g., part processing parameters 130) from the memory (e.g., repository 104), and transmitting the at least one of the curing parameters (e.g., curing parameters 124) and the part processing parameters (e.g., part processing parameters 130) to the client computing device (e.g., client system 106).

In some implementations, process 500 additionally includes scanning the panel identifier (e.g., panel identifier 128) from the composite material panel (e.g., panel 120). In some implementations, process 500 additionally includes scanning the at least one part identifier (e.g., part identifier 148). In some implementations, process 500 additionally includes determining an amount of progress for the at least one part (e.g., part 121) based at least in part on at least one of the curing parameters (e.g., curing parameters 124) and the part processing parameters (e.g., part processing parameters 130). Further, in some implementations, process 500 includes determining an amount of change to a predefined schedule for completion of the at least one part, based on the amount of progress. In some implementations, process 500 additionally includes providing automated system access from any point in the process to retrieve critical process data and data traceability. In some implementations, process 500 additionally includes detecting process variability from engineering design data including percent deviation, threshold limits, acceptable range, or failure mode.

A technical effect of systems and methods described herein includes at least one of: (a) generating a panel identifier to be applied to a composite material panel; (b) storing, in a memory, at least one curing parameter associated with a curing process performed on the composite material panel in association with the panel identifier; (c) generating at least one part identifier to be applied to at least one part machined from the composite material panel; and (d) storing, in the memory, at least one part processing parameter in association with at least one process performed on the at least one part.

As compared to known methods and systems for tracking information for a manufactured part, such as a composite material part, the methods and systems described herein assign identifiers to the underlying composite material panel and to the parts generated from the panel, and automatically store information pertaining to the lifecycle of the parts in a repository, in association with the identifiers. Accordingly, quality discrepancies in one of the parts can be easily tracked down to a particular source material and/or parameter of a manufacturing process for the part.

Implementations of the disclosure focus on composite structures utilized for aircraft interior parts and embody intelligent algorithms to interrogate critical fabrication parameters such as cure temperature and pressure applied by large laminating press equipment and traceability of in-process materials and parts by unique part identification throughout the life-cycle. The parts include, for example, stow bins, side walls, partitions, and crew stations. The solution provides a reliable and accessible traceability mechanism with intelligent algorithms to sort out critical engineering and manufacturing data. The data source (e.g., repository) is updated in real time and is capable of reporting parameters that are important for quality and performance including root cause analysis and audits. Recalls could be costly if deviations for engineering specifications are not isolated to the exact material lot number and/or stock panel. Implementations of the disclosure provide an accurate way to keep track of parts and materials and reduce the labor to research and analyze data from several systems.

Implementations of the disclosure embody intelligent algorithms to interrogate primary fabrication parameters from thousands of data points such as the cure temperature and pressure used by the press and traceability of in-process materials and parts by unique part identification throughout the life-cycle, including installation and delivery. In this way, the implementations of the system provide a reliable and accessible traceability mechanism.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for tracking information associated with a manufactured part, the method is implemented by at least one computing device including at least one processor in communication with a memory, the method comprising:

generating, by the at least one computing device, a panel identifier to be applied to a composite material panel;

storing, in the memory, at least one curing parameter associated with a curing process performed on the composite material panel in association with the panel identifier, wherein the at least one curing parameter includes at least one of a peak temperature and a peak pressure applied to the composite material panel during the curing process;

generating, by the at least one computing device, at least one part identifier to be applied to at least one part machined from the composite material panel; and storing, in the memory, at least one part processing parameter in association with at least one process performed on the at least one part.

2. The method of claim 1, further comprising associating an age and a panel lot number with the panel identifier.

3. The method of claim 1, further comprising applying the panel identifier to the composite material panel in at least one of a label, a barcode, and a unique radio frequency identification (RFID) tag.

4. The method of claim 1, further comprising applying the at least one part identifier to the at least one part in at least one of a label, a barcode, and a radio frequency identification (RFID) tag.

5. The method of claim 1, further comprising:
receiving a stream of data including a plurality of part processing parameters;
filtering the stream of data to obtain peak values of the part processing parameters from thousands of data points; and
storing the peak values of the part processing parameters in the memory in association with the at least one part identifier.

6. The method of claim 1, further comprising:
detecting that one or more of the at least one curing parameter and the at least one part processing parameter has exceeded a predefined threshold value; and
generating an alert based on the detection.

7. The method of claim 1, further comprising:
receiving, from a client computing device, a query signal that includes the panel identifier and the part identifier; and
retrieving at least one of the curing parameters and the part processing parameters from the memory; and
transmitting the at least one of the curing parameters and the part processing parameters to the client computing device.

8. The method of claim 1, further comprising scanning the panel identifier from the composite material panel.

9. The method of claim 1, further comprising scanning the at least one part identifier.

10. The method of claim 1, further comprising determining an amount of progress for the at least one part based at least in part on at least one of the curing parameters and the part processing parameters.

11. The method of claim 10, further comprising determining an amount of change to a predefined schedule for completion of the at least one part, based on the amount of progress.

12. The method of claim 1, further comprising:
receiving at least one freezer parameter; and
storing the at least one freezer parameter in association with a material lot number and a material part number.

13. The method of claim 1, further comprising:
receiving at least one cutting parameter; and
storing the at least one cutting parameter in association with a raw material identifier.

14. The method of claim 1, further comprising:
providing automated system access from any point in the process to retrieve critical process data and data traceability.

15. The method of claim 1, further comprising:
detecting process variability from engineering design data including percent deviation, threshold limits, acceptable range, or failure mode.

16. A system for use in tracking information associated with a manufactured part, said system comprising at least one computing device in communication with a memory, said at least one computing device configured to:
generate a panel identifier to be applied to a composite material panel;
store, in the memory, at least one curing parameter associated with a curing process performed on the composite material panel in association with the panel identifier, wherein the at least one curing parameter includes at least one of a peak temperature and a peak pressure applied to the composite material panel during the curing process;
generate at least one part identifier to be applied to at least one part machined from the composite material panel; and
store, in the memory, at least one part processing parameter in association with at least one process performed on the at least one part.

17. The system of claim 16, wherein said at least one computing device is further configured to associate an age and a panel lot number with the panel identifier.

18. The system of claim 16, wherein said at least one computing device is further configured to apply the panel identifier to the composite material panel in at least one of a label, a barcode, and a radio frequency identification (RFID) tag.

19. An aircraft part formed from a panel of composite material, said aircraft part having at least one tag applied thereto, wherein the at least one tag includes a panel identifier and a part identifier, wherein the panel identifier and part identifier are stored in a repository in association with information pertaining to an origin of the composite material and manufacturing processes performed to generate said aircraft part, wherein the information pertaining to the origin further includes at least one of a peak temperature and a peak pressure applied to the composite material panel during a curing process.

* * * * *